US009855854B2

(12) United States Patent
Nomoto et al.

(10) Patent No.: US 9,855,854 B2
(45) Date of Patent: Jan. 2, 2018

(54) CHARGE CONTROL DEVICE AND CHARGE CONTROL METHOD

(71) Applicants: FURUKAWA ELECTRIC CO., LTD., Tokyo (JP); FURUKAWA AUTOMOTIVE SYSTEMS INC., Shiga (JP)

(72) Inventors: Shinichi Nomoto, Tokyo (JP); Akira Ohno, Tokyo (JP)

(73) Assignees: FURUKAWA ELECTRIC CO., LTD., Tokyo (JP); FURUKAWA AUTOMOTIVE SYSTEMS INC., Shiga (JP)

(*) Notice: Subject to any disclaimer, the term of this patent is extended or adjusted under 35 U.S.C. 154(b) by 207 days.

(21) Appl. No.: 14/957,590

(22) Filed: Dec. 2, 2015

(65) Prior Publication Data
US 2016/0090001 A1    Mar. 31, 2016

Related U.S. Application Data

(63) Continuation of application No. PCT/JP2014/064656, filed on Jun. 2, 2014.

(30) Foreign Application Priority Data

Jun. 3, 2013 (JP) .................. 2013-116667

(51) Int. Cl.
*H02J 7/00* (2006.01)
*B60L 11/18* (2006.01)
(Continued)

(52) U.S. Cl.
CPC ........... *B60L 11/1861* (2013.01); *B60L 1/003* (2013.01); *B60L 7/18* (2013.01); *B60L 11/005* (2013.01);
(Continued)

(58) Field of Classification Search
CPC .................................................. B60L 11/1861
(Continued)

(56) References Cited

U.S. PATENT DOCUMENTS

2009/0033290 A1* 2/2009 Tomura ................. B60R 16/033
320/149
2011/0198920 A1* 8/2011 Komuro .................... B60L 7/10
307/10.1

FOREIGN PATENT DOCUMENTS

JP    2000-175306 A    6/2000
JP    2006-2626 A    1/2006
(Continued)

OTHER PUBLICATIONS

International Search Report dated Aug. 26, 2014 for International Application No. PCT/JP2014/064656, 4 pages.

*Primary Examiner* — Edward Tso
*Assistant Examiner* — Ahmed Omar
(74) *Attorney, Agent, or Firm* — Amin, Turocy & Watson, LLP

(57) ABSTRACT

To efficiently control charging and regenerative control for a secondary battery. A charge control device, including: a calculation unit (voltage sensor (11), current sensor (12), and control unit (10)) that calculates a state of charge of the secondary battery; a detection unit (vehicle state detection unit (20)) that detects a traveling state of the vehicle; and a control unit (control unit (10)) that, when it is detected that the vehicle is decelerating, sets a voltage generated by an alternator higher than the terminal voltage of the secondary battery in order to regeneratively charge the secondary battery, that, when it is detected that that the vehicle is not decelerating, sets the voltage generated by the alternator lower than the terminal voltage of the secondary battery when a state of charge is greater than a prescribed second threshold value, and that sets the voltage generated by the
(Continued)

alternator higher than the terminal voltage of the secondary battery when the state of charge is less than a prescribed first threshold value. The second threshold value is greater than the first threshold value, and the first threshold value and the second threshold value are set within a low SOC region.

18 Claims, 13 Drawing Sheets

(51) Int. Cl.

| | | |
|---|---|---|
| *B60W 30/18* | (2012.01) | |
| *B60L 1/00* | (2006.01) | |
| *B60L 7/18* | (2006.01) | |
| *B60L 11/00* | (2006.01) | |
| *B60L 11/14* | (2006.01) | |
| *B60L 15/20* | (2006.01) | |
| *H01M 10/44* | (2006.01) | |
| *H02J 7/16* | (2006.01) | |
| *H02J 7/14* | (2006.01) | |

(52) U.S. Cl.
CPC ............ *B60L 11/14* (2013.01); *B60L 11/1848* (2013.01); *B60L 11/1862* (2013.01); *B60L 15/20* (2013.01); *B60W 30/18127* (2013.01); *H01M 10/44* (2013.01); *B60L 2210/10* (2013.01); *B60L 2210/30* (2013.01); *B60L 2210/40* (2013.01); *B60L 2240/12* (2013.01); *B60L 2240/441* (2013.01); *B60L 2240/545* (2013.01); *B60L 2240/547* (2013.01); *B60L 2240/549* (2013.01); *B60L 2240/662* (2013.01); *B60L 2260/26* (2013.01); *H02J 7/1446* (2013.01); *H02J 7/16* (2013.01); *Y02T 10/645* (2013.01); *Y02T 10/70* (2013.01); *Y02T 10/705* (2013.01); *Y02T 10/7016* (2013.01); *Y02T 10/7022* (2013.01); *Y02T 10/7044* (2013.01); *Y02T 10/7077* (2013.01); *Y02T 10/7216* (2013.01); *Y02T 10/7241* (2013.01); *Y02T 10/7275* (2013.01); *Y02T 10/7291* (2013.01); *Y02T 10/92* (2013.01); *Y02T 90/16* (2013.01)

(58) Field of Classification Search
USPC .......................................................... 320/109
See application file for complete search history.

(56) References Cited

FOREIGN PATENT DOCUMENTS

| | | |
|---|---|---|
| JP | 2007-230513 A | 9/2007 |
| JP | 2007-318888 A | 12/2007 |
| JP | 2009-180125 A | 8/2009 |
| JP | 2010-017060 A | 1/2010 |
| JP | 2010-119176 A | 5/2010 |
| JP | 2010-217079 A | 9/2010 |
| JP | 2010-241185 A | 10/2010 |
| JP | 2010-283959 A | 12/2010 |
| JP | 2011-106953 A | 6/2011 |
| JP | 2013-090450 A | 5/2013 |
| JP | 2013-101058 A | 5/2013 |

\* cited by examiner

CHARGE CONTROL DEVICE AND CHARGE CONTROL METHOD

CROSS-REFERENCE TO RELATED APPLICATIONS

This application is a continuation application of, and claims priority to, International Application No. PCT/JP2014/064656, filed Jun. 2, 2014 and entitled "CHARGE CONTROL DEVICE AND CHARGE CONTROL METHOD", which claims priority to Japanese Patent Application No. 2013-116667, filed Jun. 3, 2013, the disclosures of each of which are incorporated herein by reference in their entireties.

TECHNICAL FIELD

The present invention relates to a charge control device and a charge control method.

BACKGROUND

In vehicles such as automobiles, engine power drives an alternator (a generator) to generate electric power that is used to charge a secondary battery. The electric power stored in the secondary battery is then used to drive various loads (such as an electric power steering system).

In recent years, technologies for using the alternator to convert the kinetic energy of the vehicle to electrical energy as the vehicle is decelerating and storing the resulting electric power in the secondary battery have been proposed.

For example, Patent Document 1 discloses a technology in which the voltage of the alternator is set to high as the vehicle is decelerating in order to regeneratively store electric power in the secondary battery. Moreover, Patent Document 2 discloses a technology in which the charge current is used to estimate the amount of charge (SOC) of the secondary battery and the secondary battery is regeneratively charged on the basis of that estimation. Patent Documents 3 and 4 disclose technologies in which two electric power storage devices are used to perform regenerative charging efficiently.

PRIOR ART DOCUMENT

Patent Document

Patent Document 1: Japanese Unexamined Patent Application Publication No. 2010-283959A
Patent Document 2: Japanese Unexamined Patent Application Publication No. 2007-318888A
Patent Document 3: Japanese Unexamined Patent Application Publication No. 2006-2626A
Patent Document 4: Japanese Unexamined Patent Application Publication No. 2010-119176A

SUMMARY OF THE INVENTION

Problems to be Solved by the Invention

In a secondary battery, as the state of charge decreases, the charge current the secondary battery can accept (that is, charging efficiency) increases, and therefore it is preferable that the secondary battery be operated at a relatively low state of charge. In conventional charging control technologies, however, the state of charge of the secondary battery is calculated by integrating the charge current. Therefore, the secondary battery must be fully charged once before estimating the state of charge in order to minimize the accumulation of calculation errors in the estimation. Some of the electric power needed to fully charge the secondary battery goes to waste, and as the state of charge increases, the charge current the second battery can accept decreases, thereby decreasing the efficiency of regenerative charging. Moreover, the method of using two electric power storage devices results in higher costs because twice as many components are needed for the electric power storage devices and the charging process. Also, because the power is supplied from two electric power storage devices which have different voltages, a DC/DC converter is required, for example, thereby further increasing the costs.

Therefore, an object of the present invention is to provide a charge control device and a charge control method with which regenerative charging and normal charging of the secondary battery can be controlled efficiently.

Means to Solve the Problem

In order to solve the abovementioned problems, the present invention provides a charge control device for controlling a state of charge of a secondary battery equipped in a vehicle. The charge control device includes: calculation means for calculating a current state of charge of the secondary battery based on charge and discharge currents and a terminal voltage of the secondary battery; detection means for detecting a traveling state of the vehicle; and control means for, when the detection means detects that the vehicle is decelerating, setting a voltage generated by an alternator higher than the terminal voltage of the secondary battery in order to charge the secondary battery with regeneratively generated power, and when the detection means detects that the vehicle is not decelerating, setting the voltage generated by the alternator lower than the terminal voltage of the secondary battery when a state of charge of the secondary battery calculated by the calculation means is greater than a prescribed second threshold value, and setting the voltage generated by the alternator higher than the terminal voltage of the secondary battery when the state of charge of the secondary battery calculated by the calculation means is less than a prescribed first threshold value. The second threshold value is greater than the first threshold value, and the first threshold value and the second threshold value are set within a low SOC region This configuration makes it possible to efficiently control regenerative charging and normal charging of the secondary battery.

Moreover, one aspect of the present invention is that, when the secondary battery is charged with a maximum charge current of the alternator within an output voltage range of the alternator, the low SOC region is set such that a time from when charging begins until a charge current that flows to the secondary battery begins to decrease from the maximum charge current is greater than or equal to a prescribed value.

In this configuration, the secondary battery is operated within a low SOC region, thereby making it possible to increase the battery's ability to accept charge as well as to improve fuel consumption.

Furthermore, one aspect of the present invention is that the low SOC region is set according to a relationship between an internal resistance of the secondary battery and the state of charge of the secondary battery such that the internal resistance is less than or equal to a prescribed value.

In this configuration, the secondary battery is operated within the low SOC region, thereby making it possible to increase the battery's ability to accept charge as well as to improve fuel consumption.

In addition, one aspect of the present invention is that the low SOC region is a region in which a charge current that flows to the secondary battery is greater than or equal to a prescribed value when a prescribed time elapses after charging begins.

In this configuration, the secondary battery is operated within the low SOC region, thereby making it possible to increase the battery's ability to accept charge as well as to improve fuel consumption.

Moreover, one aspect of the present invention is that the low SOC region is a region in which an amount of charge stored in the secondary battery from when charging begins until a prescribed time elapses is greater than or equal to a prescribed value.

In this configuration, the secondary battery is operated within the low SOC region, thereby making it possible to increase the battery's ability to accept charge as well as to improve fuel consumption.

Furthermore, one aspect of the present invention is that the secondary battery is a hybrid secondary battery in which a secondary battery that stores electric power using an electrochemical reaction is combined with a capacitor that takes advantage of an electric charge absorption phenomenon.

In this configuration, the secondary battery is operated at the low state of charge, thereby making it possible to improve charging efficiency and fuel consumption.

In addition, one aspect of the present invention is that the calculation means measure internal impedance using pulse discharge from a discharge circuit and calculates the state of charge based on a parameter of an equivalent circuit model of the secondary battery.

This configuration makes it possible to accurately obtain the state of charge of the secondary battery and use this accurate state of charge to more reliably control charging.

Moreover, one aspect of the present invention is that the electric power storage device equipped in the vehicle for storing the regeneratively generated electric power only includes the secondary battery.

This configuration makes it possible to reduce production costs and simplify maintenance in comparison with when multiple electric power storage devices are used.

Furthermore, one aspect of the present invention is that the control means change the first threshold value and the second threshold value according to a state of the secondary battery.

In this configuration, the two threshold values are changed according to the state of the secondary battery. Appropriately changing these values according to the deterioration of the secondary battery, for example, makes it possible to maintain high fuel economy regardless of the deterioration of the secondary battery.

In addition, one aspect of the present invention is that, when the vehicle is not decelerating, the voltage generated by the alternator is set lower than the terminal voltage of the secondary battery in order to supply power from the secondary battery to a load.

This configuration makes it possible to reduce the load on the engine when the vehicle is accelerating by stopping the supply of power from the alternator, thereby improving fuel consumption, for example.

Moreover, one aspect of the present invention is that the alternator has a range of voltage to be generated that is selected from a first voltage range and a second voltage range that is lower than the first voltage range, and the control means select one of the first voltage range and the second voltage range according to the state of the secondary battery and the state of the vehicle.

This configuration makes it possible to simply and efficiently perform regenerative charging by selecting between two voltage ranges.

Furthermore, one aspect of the present invention is that the alternator is capable of outputting a specified voltage, and the control means cause the alternator to output a voltage according to the state of the secondary battery and the state of the vehicle.

This configuration makes it possible to more efficiently perform regenerative charging by finely controlling the voltage.

In addition, one aspect of the present invention is that the control means control the alternator according to the traveling state of the vehicle and the state of charge of the secondary battery such that a difference between the terminal voltage of the secondary battery and the voltage generated by the alternator is equal to a prescribed desired value.

This configuration makes it possible to charge the secondary battery with a constant current.

Moreover, one aspect of the present invention is that, when the vehicle is decelerating, the control means determine a difference voltage between the terminal voltage of the secondary battery and a reference voltage and control the alternator such that the alternator generates a voltage that is equal to a voltage obtained by adding the difference voltage to the reference voltage.

This configuration makes it possible to rapidly charge the secondary battery by setting the voltage of the alternator high when the state of charge is low.

Furthermore, one aspect of the present invention is that the control means determine that the vehicle is decelerating when a vehicle speed is greater than or equal to a prescribed speed and an instruction to cut supply of fuel has been issued in the form of a fuel cut instruction signal.

This configuration makes it possible to easily detect when the vehicle is decelerating.

In addition, one aspect of the present invention is that it is determined that the vehicle is decelerating when, in addition to the vehicle speed and fuel cut instruction signal, a degree of opening of an accelerator of the vehicle is less than or equal to a prescribed degree of opening.

This configuration makes it possible to reliably detect when the vehicle is decelerating.

Moreover, one aspect of the present invention is that regenerative charging is stopped when any one of the vehicle speed, the fuel cut instruction signal, and the degree of opening of the accelerator no longer fulfills conditions.

This configuration makes it possible to prevent an unnecessary load from being applied to the engine when charging the secondary battery while the vehicle is not decelerating.

Furthermore, one aspect of the present invention is a charge control method for controlling a state of charge of a secondary battery equipped in a vehicle. The method includes the steps of: calculating a current state of charge of the secondary battery based on charge and discharge currents and a terminal voltage of the secondary battery; detecting a traveling state of the vehicle; and controlling to, when the step of detecting detects that the vehicle is decelerating, set a voltage generated by an alternator higher than the terminal voltage of the secondary battery in order to charge the secondary battery with regeneratively generated power, and when the step of detecting detects that the vehicle is not decelerating, set the voltage generated by the alternator lower than the terminal voltage of the secondary battery when a state of charge of the secondary battery calculated by the step of calculating is greater than a prescribed second threshold value, and set the voltage generated by the alternator higher than the terminal voltage of the secondary battery when the state of charge of the secondary battery calculated by the step of calculating is less than a prescribed first threshold value. The second threshold value is greater than the first threshold value, and the first threshold value and the second threshold value are set within a low SOC region.

This method makes it possible to efficiently control regenerative charging and normal charging of the secondary battery.

Effect of the Invention

The present invention makes it possible to provide a charge control device and a charge control method with which regenerative charging and normal charging of the secondary battery can be controlled efficiently.

BEST MODE FOR CARRYING OUT THE INVENTION

An embodiment of the present invention will be described below.

(A) Configuration of the Embodiment

Figure 1:
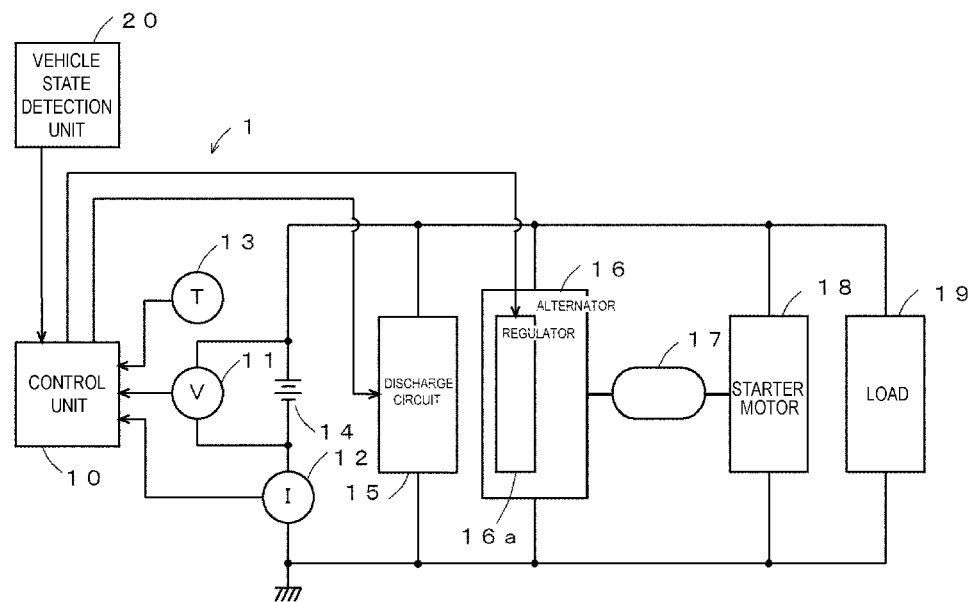
FIG. 1 illustrates an example of a configuration of a charge control device according to an embodiment of the present invention.

FIG. 1 illustrates a vehicle power supply system equipped with a charge control device according to the embodiment of the present invention. The charge control device 1 of the present embodiment includes the following primary components: a control unit 10, a voltage sensor 11, a current sensor 12, a temperature sensor 13, and a discharge circuit 15. In the present embodiment, the control unit 10 includes calculation means and control means, but the calculation means and the control means may also be provided separately.

Figure 2:
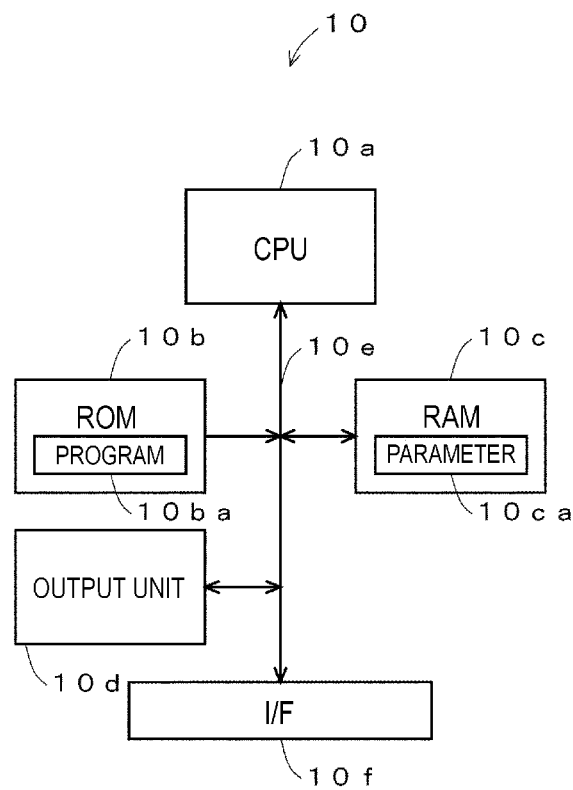
FIG. 2 is a block diagram illustrating an example of a configuration for the control unit illustrated in FIG. 1.

Here, the control unit 10 calculates the state of charge (SOC) of a hybrid battery 14 and controls a regulator 16a on the basis of the calculated SOC. FIG. 2 illustrates an example of a configuration of the control unit 10 in detail. As illustrated in FIG. 2, the control unit 10 includes a central processing unit (CPU) 10a, a read-only memory (ROM) 10b, a random access memory (RAM) 10c, an output unit 10d, a bus 10e, and an interface (I/F) 10f. Here, the CPU 10a controls components according to a program 10ba stored in the ROM 10b. The ROM 10b, which is, for example, a semiconductor memory, stores the program 10ba and the like. The RAM 10c, which is, for example, a semiconductor memory, stores parameters 10ca generated when executing the program 10ba. The output unit 10d sends a pulse discharge ON/OFF control signal for measuring the internal resistance of the hybrid battery 14 to the discharge circuit 15 and also sends a voltage generation control signal to the regulator 16a of an alternator 16. The bus 10e is a group of signal lines that make it possible to transfer data between the CPU 10a, the ROM 10b, the RAM 10c, the output unit 10d, and the I/F 10f. The I/F 10f converts signals sent from the voltage sensor 11, the current sensor 12, the temperature sensor 13, and a vehicle state detection unit 20 to digital signals and takes the resulting signals.

The voltage sensor 11 detects the terminal voltage of the hybrid battery 14 and sends the result to the control unit 10. The current sensor 12 detects the charge and discharge currents flowing to and from the hybrid battery 14 and sends the result to the control unit 10. The temperature sensor 13 detects the temperature of the hybrid battery 14 itself or the ambient temperature therearound and sends the result to the control unit 10. The discharge circuit 15 is a semiconductor switch that turns on or off according to the pulse discharge ON/OFF control signal from the control unit 10, for example. The two output terminals of the discharge circuit 15 are connected to a control signal line of the control unit 10 and to the ground, and the input terminal of the discharge circuit 15 is connected to the control unit 10. Furthermore, when the pulse discharge ON/OFF control signal is set to the high level, the discharge circuit 15 takes a high impedance (off) state, and when the pulse discharge ON/OFF control signal is set to the low level, the discharge circuit 15 takes a low impedance (on) state.

The hybrid battery 14 is a lead-acid battery which is provided with a negative electrode plate used as a negative electrode. The negative electrode plate has, on the surface of a negative electrode active material-impregnated plate, a covering layer of a carbon mixture containing a conductive carbon material, an activated carbon material that exhibits capacitance and pseudo-capacitance, and a binder, for example. This hybrid battery 14 is charged by the alternator 16, drives a starter motor 18 that starts an engine 17, and supplies electric power to a load 19. Moreover, when the vehicle is decelerating, the hybrid battery 14 is charged with electric power regenerated by the alternator 16. The alternator 16 is driven by the rotational force supplied by the engine 17 or by the inertial force of the vehicle when the vehicle is decelerating. The alternator 16 generates AC power that is converted to DC power by a rectifier circuit. The regulator 16a adjusts the voltage of this DC power, which is then used to charge the hybrid battery 14. In the present invention, the use of the hybrid battery 14 allows for a configuration with a single electric power storage device, which eliminates the need for two or more secondary batteries or capacitors. Therefore, in comparison to a charge control device that includes two or more electric power storage devices, components such as an additional secondary battery and a voltage converter (such as a DC-DC converter) can be removed, thereby making it possible to provide the charge control device at a lower cost.

The vehicle state detection unit 20 detects, for example, the vehicle speed, the engine RPM, the accelerator opening degree, fuel cut signals, and the current brake state and sends the result to the control unit 10. The control unit 10 controls the regulator 16a according to the vehicle state detected by the vehicle state detection unit 20 and the state of the hybrid battery 14 detected by the voltage sensor 11, the current sensor 12, and the temperature sensor 13 in order to adjust the voltage generated by the alternator 16, thereby controlling the state of charge of the hybrid battery 14. The regulator 16a controls the current flowing through the exciting coil of the alternator 16 (not illustrated) according to control signals sent from the control unit 10, thereby controlling the voltage generated by the alternator 16. Furthermore, in the present embodiment, when the voltage generation control signal output by the control unit 10 is set to high (Hi), the alternator 16 generates a voltage within a high voltage range, and when the voltage generation control signal output by the control unit 10 is set to low (Lo), the alternator 16 generates a voltage within a low voltage range.

Figure 3:
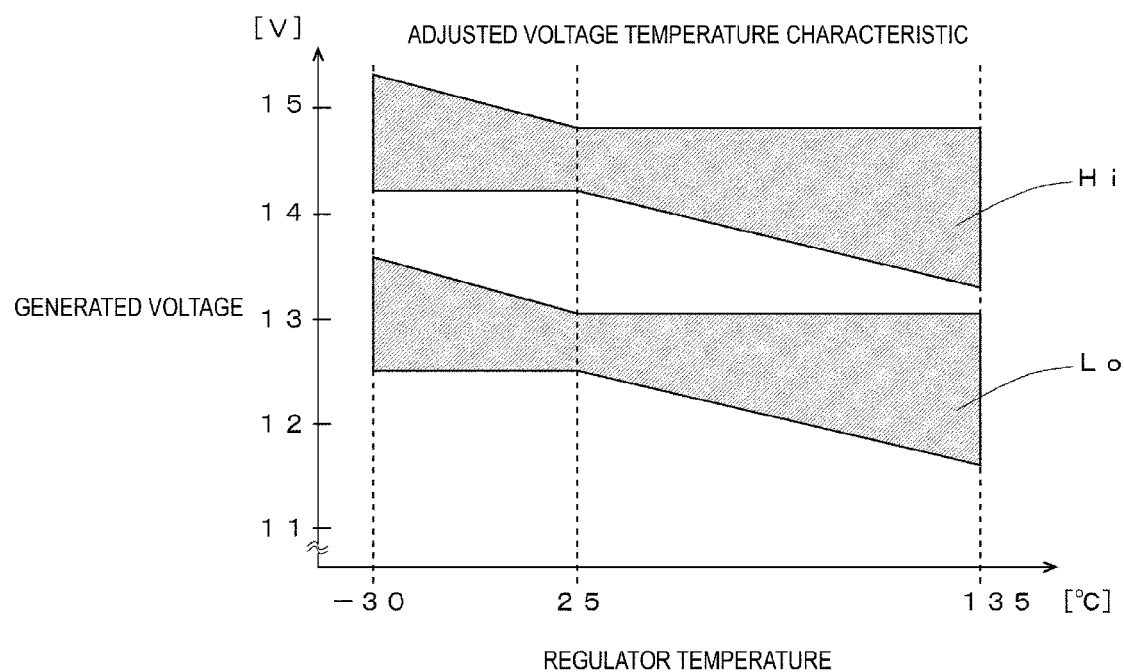
FIG. 3 is a graph showing the range of voltages generated by an alternator.

FIG. 3 is a graph that shows the relationship between the ambient temperature around the regulator 16a (the case temperature, for example) and the generated voltage. Here, the upper hatched region shows how the generated voltage changes according to temperature when the voltage generation control signal is set to Hi. Furthermore, the lower hatched region shows how the generated voltage changes according to temperature when the voltage generation control signal is set to Lo. In this way, the voltage generated by the alternator 16 falls within different voltage ranges depending on whether the voltage generation control signal sent from the control unit 10 to the regulator 16a is set to Hi or Lo.

The engine 17 is a reciprocating engine such as a petrol engine or a diesel engine, or a rotary engine, for example. The engine 17 is started by the starter motor 18 and drives drive wheels via a transmission to supply propulsive power to the vehicle. The engine 17 also drives the alternator 16 to generate electric power. The starter motor 18 is a DC motor, for example, and generates a rotational force using electric power supplied from the hybrid battery 14 to start the engine 17. Examples of the load 19 include an electric power steering motor, a defogger, an ignition coil, a car audio system, and a car navigation system, and run on electric power from the hybrid battery 14.

Figure 4:
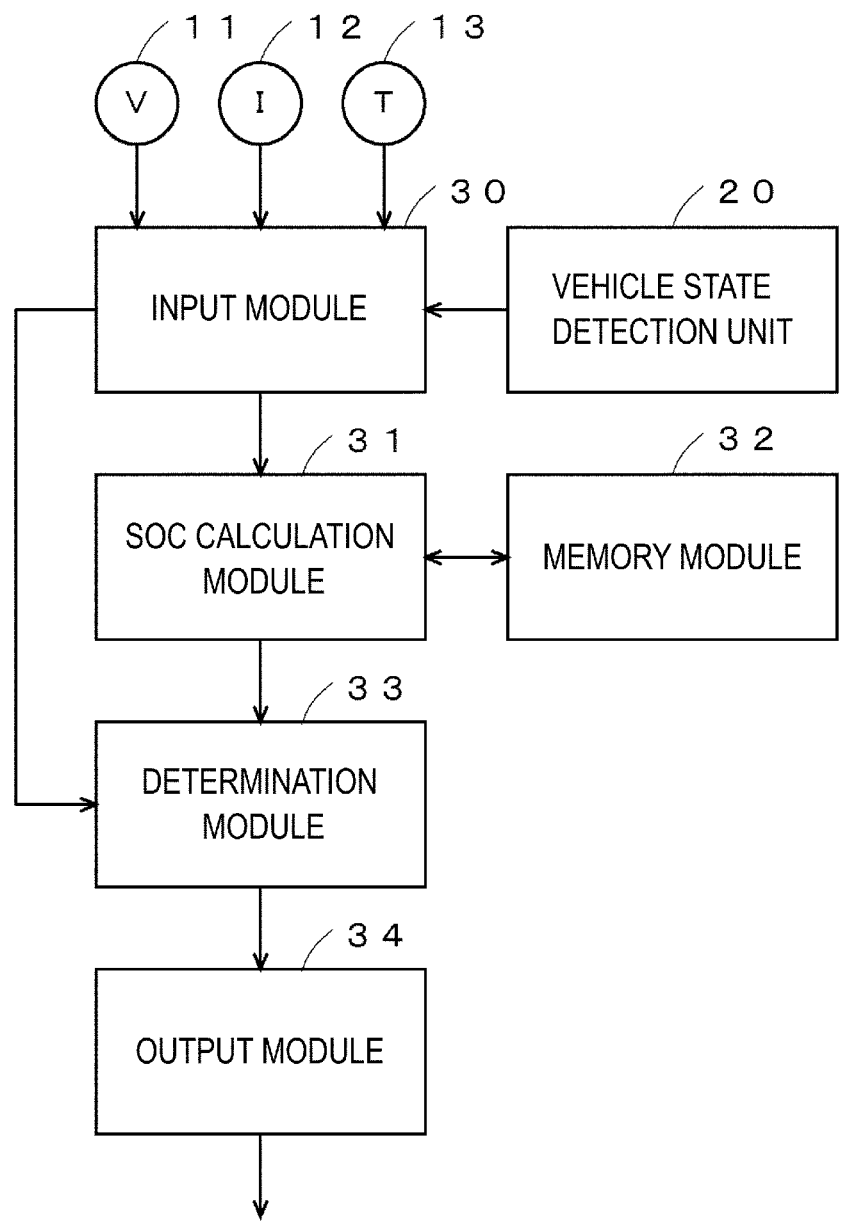
FIG. 4 illustrates an example of a processing module used to execute the program illustrated in FIG. 2.

FIG. 4 illustrates a processing module that functions by the cooperative work of the hardware resources such as the CPU 10a and the software resources such as the program 10ba when the program 10ba illustrated in FIG. 3 is executed. In this example, the processing module includes the following primary components: an input module 30, an SOC calculation module 31, a memory module 32, and an output module 34. Here, the input module 30 receives signals output by the voltage sensor 11, the current sensor 12, the temperature sensor 13, and the vehicle state detection unit 20 and sends those signals to the SOC calculation module 31. The SOC calculation module 31 uses the voltage, current, and temperature sent from the input module 30 to calculate the current SOC of the hybrid battery 14 and then sends the calculated SOC to a determination module 33. Examples of an SOC calculation method include a method in which an equivalent circuit model for the hybrid battery 14 is created, pulse discharges are generated by the discharge circuit 15 and used to measure the internal impedance of the hybrid battery 14, and an adaptive learning with a Kalman filter or the like is then applied to the parameters of the equivalent circuit model to calculate the SOC on the basis of parameters thus obtained. Alternatively, the SOC may be determined by obtaining an exponential function that approximates the time characteristics of the open circuit voltage of the hybrid battery 14, obtaining the current open circuit voltage of the hybrid battery 14 from that exponential function, and then using the obtained open circuit voltage to calculate the SOC. The SOC may of course also be calculated using a method other than the above-described methods. The memory module 32 stores the parameters and equivalent circuit model needed for the SOC calculation module 31 to calculate the SOC. The determination module 33 outputs, to the output module 34, control information based on the information from the vehicle state detection unit 20 and the SOC. The output module 34 controls the regulator 16a and the like according to the output from the determination module 33.

(B) Overview of Operation of the Embodiment

Figure 5:
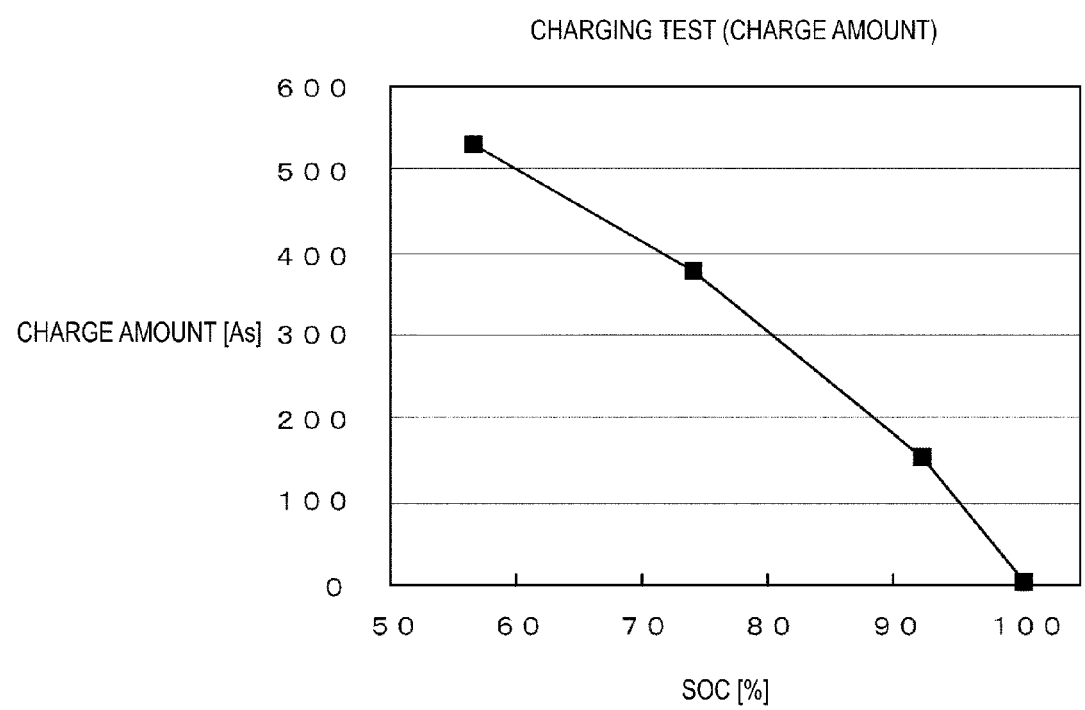
FIG. 5 shows the relationship between the SOC and the amount of charge of a hybrid battery.

Next, an overview of operation of the present embodiment will be provided. In the embodiment of the present invention, the regulator 16a is controlled when the vehicle is decelerating to increase the voltage generated by the alternator 16 in order to increase the charge current supplied to the hybrid battery 14. As a result, the kinetic energy of the vehicle is converted to electrical energy and stored in the hybrid battery 14. FIG. 5 shows the relationship between the amount of charge and the SOC of a lead-acid battery. Here, "amount of charge" refers to the amount of electric charge stored when the battery is charged for 10 seconds (that is, the amount of charge accepted by the battery). As shown in FIG. 5, as the SOC of the lead-acid battery increases, the amount of charge stored in 10 seconds (that is, the amount of charge accepted by the battery) decreases. As a result, in order to charge the battery efficiently, it is preferable that the battery be operated at the lowest possible SOC. However, using a lead-acid battery at a low SOC typically reduces the lifespan of the battery due to the resulting sulfation, and the capacity of the battery may not be sufficient to drive the starter motor 18 and start the engine 17.

Figure 6:
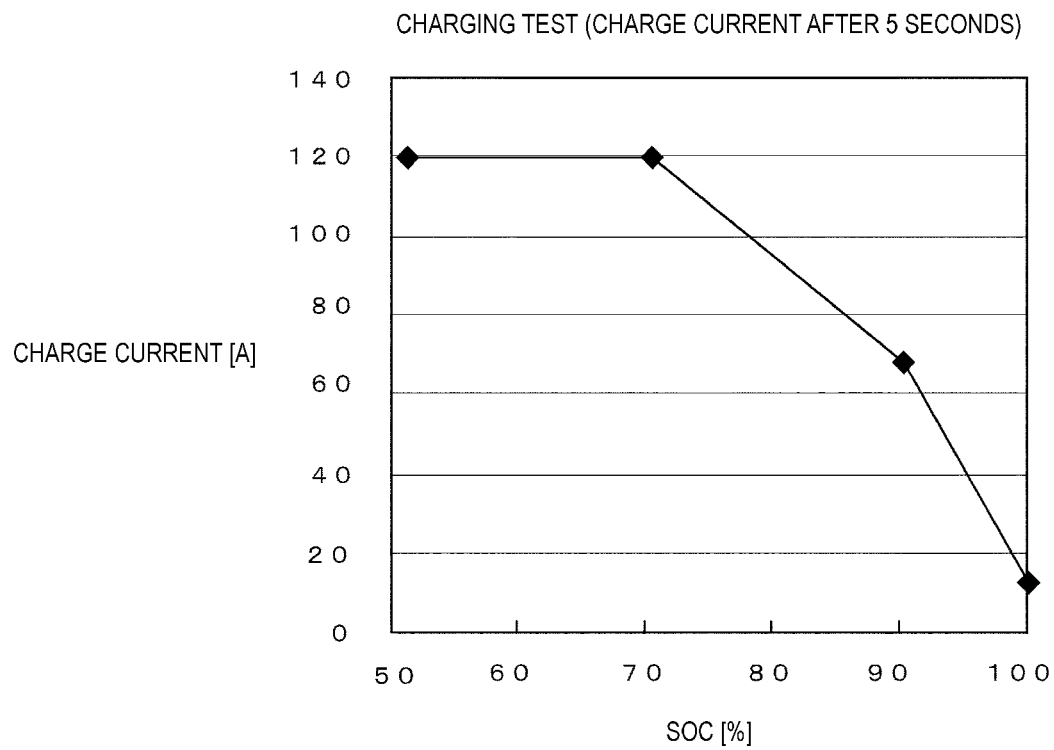
FIG. 6 shows the relationship between the SOC and the charge current of a hybrid battery.
Figure 7:
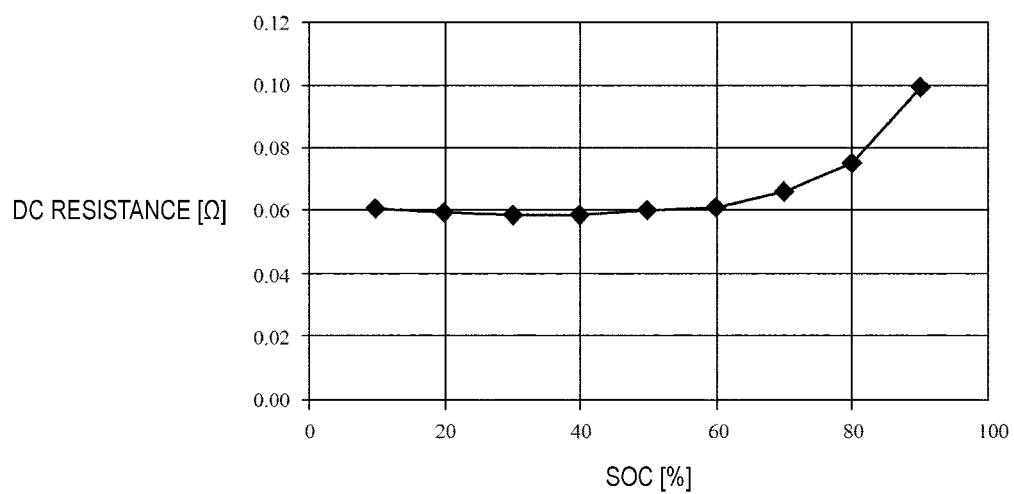
FIG. 7 shows the relationship between the SOC and the DC resistance of a hybrid battery.

Moreover, in an actual vehicle, to efficiently charge a battery using regenerated electric power, the current generated by the alternator must be taken into consideration. For example, FIG. 6 shows the relationship between charge current and SOC at 5 seconds after the charge process begins when the alternator generates a voltage of 14.5V and a current of 120 A. In this case, the charge current decreases if the SOC is 72% or greater. Therefore, keeping the battery at a SOC of not more than 72% makes it possible to efficiently charge the battery. The SOC value required to efficiently charge the battery using regenerated electric power may also be set according to the charging characteristics of the secondary battery. FIG. 7 shows an example of the relationship between the internal resistance and the SOC when charging the hybrid battery 14. The internal resistance is substantially constant when the SOC is less than or equal to 60%, and the internal resistance increases rapidly when the SOC is 70% or greater. Keeping the secondary battery with the low internal resistance in the low SOC region makes it possible to efficiently charge the battery using regenerated electric power. When the battery is operated in the low SOC state, the startability of the engine must also be taken in consideration. The SOC that secure the startability of the engine will differ significantly depending on the systems present in the vehicle. In general, the SOC should be set to 50% or greater. The present embodiment takes these items into consideration and keeps the hybrid battery 14 at a low SOC and utilizes the following control process to regeneratively charge the hybrid battery 14 efficiently.

Figures 8, 9:
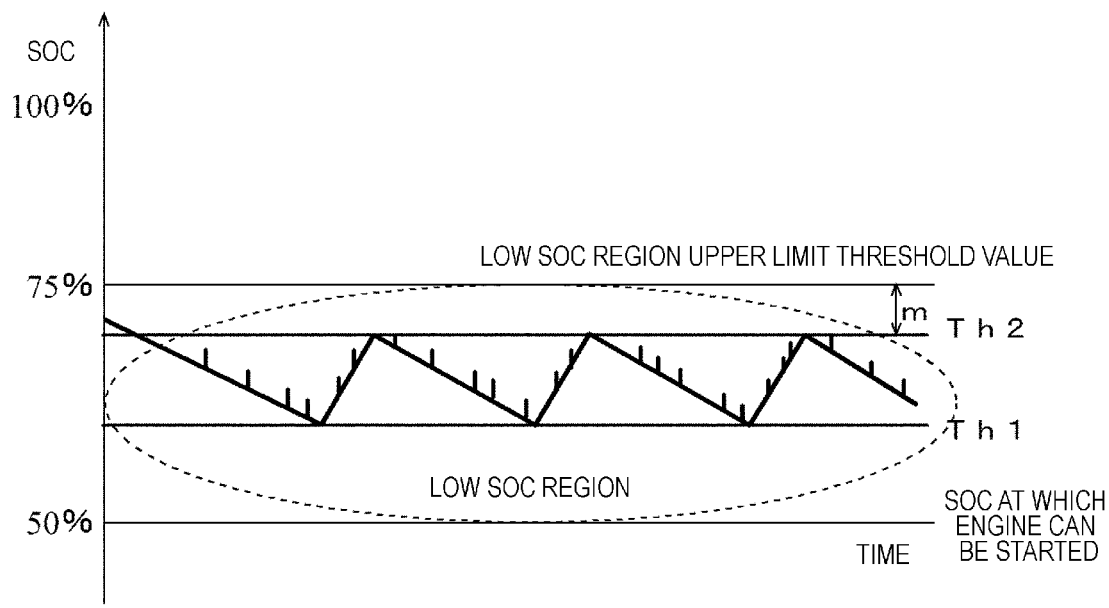
FIG. 8 illustrates operation of an embodiment of the present invention.
FIG. 9 shows the relationship between the SOC of a hybrid battery and the voltage generated by an alternator.

FIG. 8 illustrates the relationship between the state of control signals and the generated voltage. As illustrated in FIG. 8, in the present embodiment, different processes are used for an initial state that occurs immediately after the engine 17 is started and a normal state that occurs during all other times. First, the operation of the embodiment during the initial state will be described, and then the operation of the embodiment during the normal state will be described.

In the initial state that occurs immediately after the engine 17 is started, the charge control device 1 executes an initial process. As illustrated on the left side of the Control Unit State column in FIG. 8, during the initial process, when the SOC is greater than or equal to a second threshold value Th2, the voltage generation control signal sent to the regulator 16a is set to ON. Also, as illustrated on the left side of the Generated Voltage column in FIG. 8, the voltage generated by the alternator 16 switches to the low state (the Lo state in FIG. 3). Meanwhile, when the SOC is less than the second threshold value Th2, the voltage generation control signal is set to OFF, and the voltage generated by the alternator 16 switches to the high state (the Hi state in FIG. 3). In other words, in the initial state that occurs immediately after the engine 17 is started, if the SOC of the hybrid battery 14 is less than the second threshold value Th2, the generated voltage is switched to the Hi state and the hybrid battery 14 is quickly charged.

A prescribed period of time elapses after the engine 17 is started, thereby proceeding to a normal process. In the normal process, charging is controlled according to a threshold value that exhibits hysteresis. More specifically, as illustrated on the left side of FIG. 8, charging is controlled on the basis of the first threshold value Th1 and the second threshold value Th2. As illustrated on the right side of the Control Unit State column in FIG. 8, during the normal process, when the SOC is increasing and less than the second threshold value Th2, the voltage generation control signal is set to OFF. Also, as illustrated on the right side of the Voltage Generated column in FIG. 8, the voltage generated by the alternator 16 switches to the high state (the Hi state in FIG. 3). Similarly, when the SOC is increasing and becomes greater than or equal to the second threshold value Th2, the voltage generation control signal is set to ON. Also, as illustrated on the right side of the Voltage Generated column in FIG. 8, the voltage generated by the alternator 16 switches to the low state (the Lo state in FIG. 3). Meanwhile, when the SOC is decreasing and greater than the first threshold value Th1, the voltage generation control signal sent to the regulator 16a is set to ON, and the voltage generated by the alternator 16 switches to the low state (the Lo state in FIG. 3). Similarly, when the SOC is decreasing and less than or equal to the first threshold value Th1, the voltage generation control signal sent to the regulator 16a is set to OFF, and the voltage generated by the alternator 16 switches to the high state (the Hi state in FIG. 3).

In this way, during the initial process that is executed immediately after the engine 17 is started, the SOC is controlled so as to be greater than or equal to the second threshold value. Once proceeding to the normal process, the voltage generated by the alternator 16 is controlled using both the first threshold value and the second threshold value.

Moreover, in the present embodiment, when the vehicle state detection unit 20 detects that the vehicle is decelerating, the regulator 16a is controlled to set the voltage output by the alternator 16 Hi. This process increases the charge current supplied by the alternator 16 to the hybrid battery 14. As a result, the kinetic energy of the vehicle can be converted to electrical energy and stored in the hybrid battery 14.

Furthermore, in this embodiment of the present invention, the SOCs used for the first threshold value and the second threshold value may be set to 70% and 71%, respectively, for example. When operated at a SOC of approximately 70%, the hybrid battery 14 typically does not exhibit significant deterioration or become unable to store enough energy to start the engine 17. Therefore, the hybrid battery 14 can be operated within the high charging efficiency region as shown in FIG. 5. As a result, the hybrid battery 14 can be charged efficiently not only when the engine 17 drives the alternator 16 to charge the hybrid battery 14 but also when the alternator 16 converts the kinetic energy of the vehicle to electrical energy and charges the hybrid battery 14 with that energy during the deceleration of the vehicle (regenerative charging).

In other words, in the present embodiment, the SOC of the hybrid battery 14 is controlled to be kept in the range between Th1 and Th2, as illustrated in FIG. 9. More specifically, when the SOC is decreasing and becomes less than or equal to Th1, the voltage output by the alternator 16 is set to Hi to increase the SOC. When the SOC is increasing and becomes greater than or equal to Th2, the voltage output by the alternator 16 is set to Lo to decrease the SOC. Such an operation brings the SOC of the hybrid battery 14 into a saw-tooth pattern as illustrated in FIG. 9, for example. Moreover, when regenerative charging is enabled, impulse waves shown on the waveform of the saw-tooth pattern charge the hybrid battery 14. Furthermore, the threshold values Th1 and Th2 are set within a low SOC region bounded above by a low SOC region upper limit threshold value Thu of the hybrid battery 14. Here, "low SOC region" refers to a lower SOC region than a high SOC region from 80 to 100% in which lead batteries are typically operated. Operating the hybrid battery 14 within this low SOC region makes it possible to increase the battery's ability to accept electric power during regenerative charging.

Moreover, the low SOC region upper limit threshold value Thu can be set according to the time it takes for the charge current that flows to the hybrid battery 14 to begin decreasing after the hybrid battery 14 starts being charged at the maximum current that can be generated by the alternator 16. More specifically, regenerative charging can typically only be enabled for less than 10 seconds when the vehicle is decelerating, and most regenerative charging periods will only last several seconds. Therefore, the low SOC region upper limit threshold value Thu can be set by assuming the time it takes for the charge current that flows to the hybrid battery 14 to begin decreasing after the hybrid battery 14 starts being charged at the maximum current to be equal to 5 seconds, for example. In this example, the low SOC region upper limit threshold value Thu is set assuming this time to be equal to 5 seconds and such that there is a prescribed margin m between the low SOC region upper limit threshold value Thu and Th2. Therefore, when the hybrid battery 14 is operated at SOC values between Th1 and Th2, it will take longer than this 5 seconds for the charge current to begin decreasing from the maximum current, thereby making it possible to store the electric power resulting from most regenerative charging periods that only last for several seconds in the hybrid battery 14.

Figure 10:
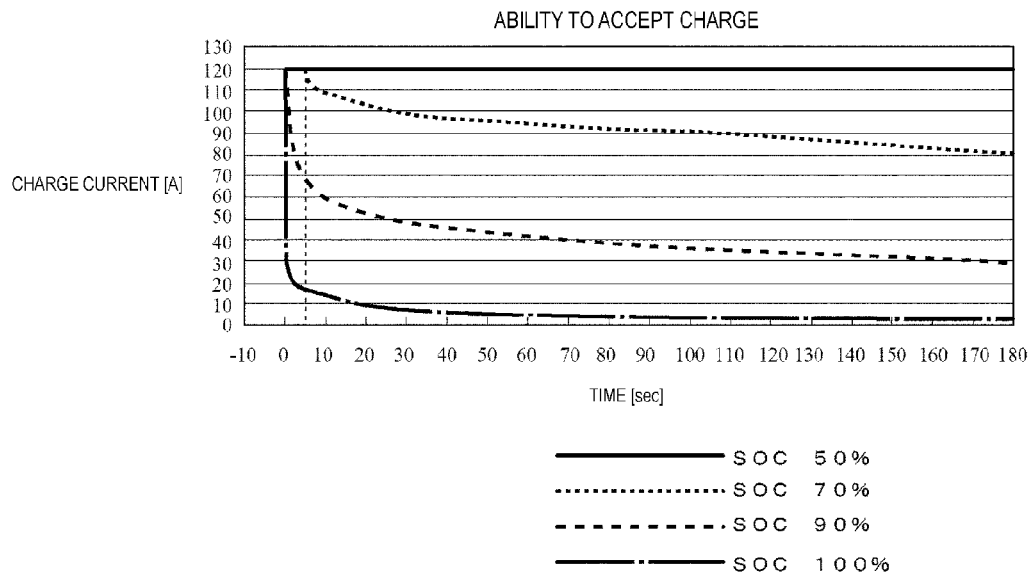
FIG. 10 shows the relationship between the charge current and charging time when charging hybrid batteries which have different SOC values with a constant current.

FIG. 10 shows several examples. FIG. 10 shows the relationship between a current that flows in a secondary battery and charging time when a single secondary battery is charged with a constant current of 120 A with its SOC set to 50%, 70%, 90%, and 100%. The constant current source is set to a maximum voltage of 16.0V, and charging starts from a time of 0 seconds in FIG. 10. When the SOC is 90% and 100%, the current decreases significantly immediately after charging is started. When the SOC is 70%, a current of 120 A can be maintained for approximately 5 seconds after charging is started. Moreover, when the SOC is 50%, the constant current of 120 A can be maintained for more than 180 seconds. Therefore, setting the SOC to a lower value makes it possible to more efficiently charge a secondary battery. In this case, the low SOC region can be determined by establishing a prescribed charging time from when charging starts and finding an SOC region in which a constant current flows throughout that charging time.

The low SOC region upper limit threshold value Thu may also be set using a different method. For example, the relationship between the internal resistance of the hybrid battery 14 (the DC resistance shown in FIG. 7) and the SOC can be examined, and the low SOC region upper limit threshold value Thu may be set to an SOC value at which the internal resistance is less than or equal to a prescribed value. In the example in FIG. 7, for example, the internal resistance increases more rapidly at SOC values of 70% or greater, and therefore an SOC of 70% may be selected as the low SOC region upper limit threshold value Thu. Alternatively, the low SOC region upper limit threshold value Thu may be set to the SOC at which the charge current takes a prescribed value after a prescribed time has elapsed after charging begins, for example (an SOC at which the charge current is 100 A or more or 90% of more of the maximum current of the alternator 16 at 5 seconds after charging starts, for example). The low SOC region upper limit threshold value Thu may also be set to the SOC at which the amount of charge as obtained by multiplying the current and time is equal to a prescribed value. In the example in FIG. 6, for example, a current of 120 A flows for 5 seconds, and therefore the maximum SOC at which a charge amount of 600 As (=120×5) is obtained (approximately 70% in FIG. 6) may be set as the low SOC region upper limit threshold value Thu. Note that the values in the description above are only examples. Different values may be selected according to the type of hybrid battery 14 used, the usage environment, or the like.

Figure 11:
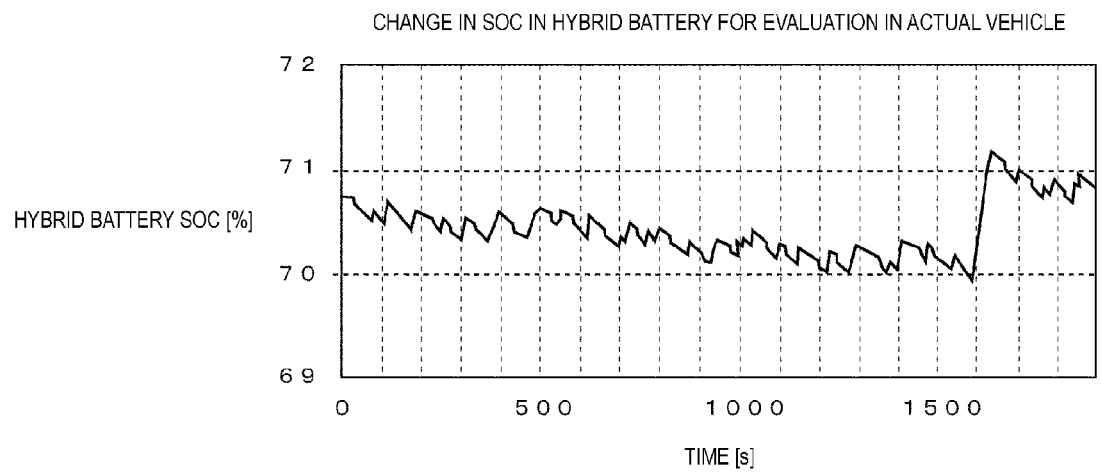
FIG. 11 shows the relationship between the SOC of a hybrid battery and time during evaluation with an actual vehicle.

FIG. 11 shows an example of how the SOC changes when the first threshold value Th1 is set to 70% and the second threshold value Th2 is set to 71%. In FIG. 11, the horizontal axis represents time (in seconds). When the SOC of the hybrid battery 14 is between 70% and 71% and the vehicle is not decelerating, the control unit 10 sets the regulator 16a to the Lo state, and the hybrid battery 14 is not charged using power from the engine 17. However, when the vehicle is decelerating, the control unit 10 sets the regulator 16a to the Hi state. The hybrid battery 14 then starts being charged using regenerated electric power. Furthermore, as illustrated in FIG. 11, when the SOC of the hybrid battery 14 falls below the first threshold value Th1 of 70% (at around 1600 sec in FIG. 11), the voltage output by the alternator 16 is set to the Hi state regardless of the current state of the vehicle, and the hybrid battery 14 is rapidly charged until the SOC is 71% or more. Such an operation allows the SOC of the hybrid battery 14 to be kept between 70 to 71%, and allows the hybrid battery 14 to be rapidly charged when the SOC falls below 70%. Moreover, when the SOC of the hybrid battery 14 is kept between 70% and 71%, the hybrid battery 14 can be regeneratively charged efficiently by setting the regulator 16a to the Hi state.

Figure 12:
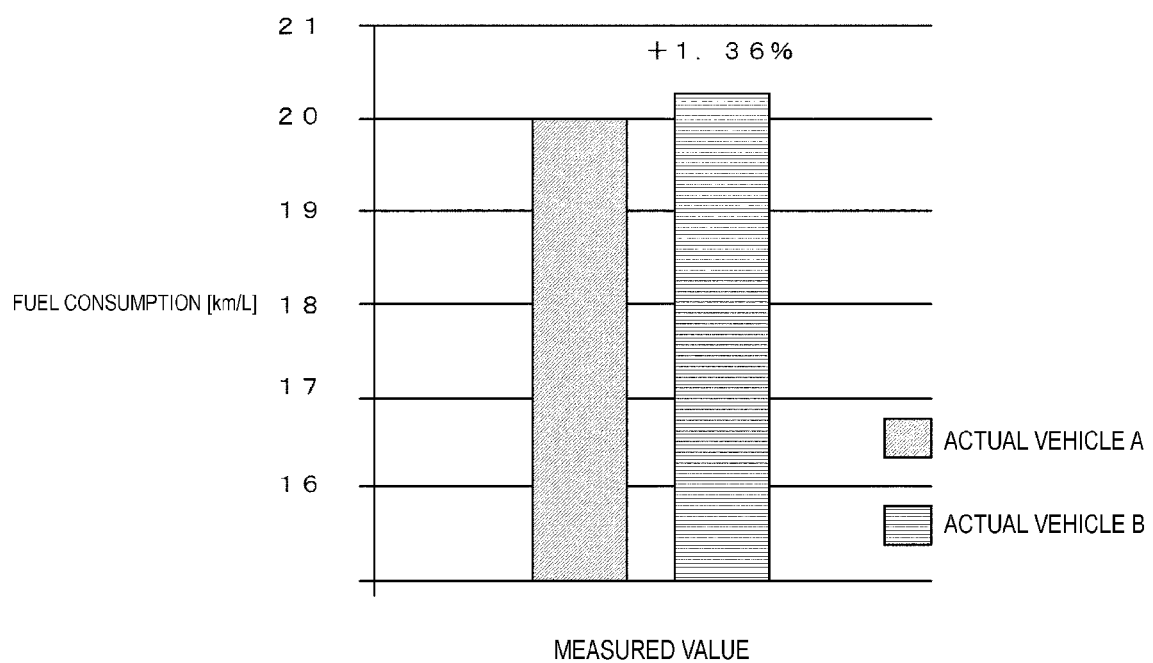
FIG. 12 shows the change in fuel consumption between vehicles with and without the embodiment illustrated in FIG. 1.

FIG. 12 shows actual measurements taken from an actual vehicle equipped with the charge control device of the present invention. In this example, the vertical axis represents fuel consumption. Vehicle A is not equipped with the charge control device of the present invention, and Vehicle B is equipped with the charge control device of the present invention. As shown in FIG. 12, when the vehicle is equipped with the charge control device of the present invention, fuel consumption improves by about 1.36% in comparison to when the vehicle is not equipped with the charge control device of the present invention. This result makes the effect of the charge control device of the present invention clear.

Next, the process executed by the control unit 10 illustrated in FIG. 1 will be described with reference to FIG. 13. Once the process illustrated in FIG. 13 starts, the following steps are executed.

In step S10, the input module 30 receives the voltage V, current I, and temperature T from the voltage sensor 11, the current sensor 12, and the temperature sensor 13, respectively.

In step S11, the SOC calculation module 31 calculates the SOC of the hybrid battery 14 using the voltage V, current I, and temperature T received in step S10 as well as data stored in the memory module 32. In this step, the SOC can be calculated, as described above, by applying the adaptive learning with a Kalman filter to an equivalent circuit model of the hybrid battery 14 and using the resulting value (the open circuit voltage (OCV), for example) to calculate the SOC, for example. Other methods may of course also be used to calculate the SOC. Such a method allows the SOC of the hybrid battery 14 to be obtained at any point in time, thereby eliminating the need to fully charge the hybrid battery 14 after starting the engine as is required in conventional technologies.

In step S12, the input module 30 receives information about the vehicle state from the vehicle state detection unit 20. More specifically, the vehicle state detection unit 20 detects the vehicle speed, the engine RPM, the accelerator opening degree, fuel cut signals, the current brake state, and the like and sends the result to the input module 30.

In step S13, the determination module 33 references the vehicle state information obtained in step S12 and determines whether the vehicle is currently decelerating (whether regenerative charging is possible). If the vehicle is currently decelerating (Yes in step S13), the flow proceeds to step S14 and sets the voltage generation state to Hi to enable regenerative charging. Otherwise (No in step S13), the flow proceeds to step S15. For example, if the vehicle speed is greater than 5 km/h, the accelerator opening degree is less than 10%, and the fuel cut signal is currently in the high state, the determination module 33 determines that the vehicle is decelerating and the flow proceeds to step S14; otherwise, the flow proceeds to step S15. Here, the fuel cut signal indicates whether to cut (stop) the supply of fuel to the engine 17. When this signal is on, fuel is not supplied to the engine 17. The criteria used to make this determination described above are only examples. Other information may also be used to determine whether the vehicle is decelerating. For example, if the fuel cut signal is only set to the high state when the vehicle is decelerating, then the determination may be performed solely on the basis of the fuel cut signal and the vehicle speed. The determination may also be made using the RPM of the engine 17 or the like. Moreover, even when it is determined that the vehicle is decelerating, regenerative charging may be stopped if certain conditions are no longer met. This makes it possible to prevent unnecessary loads on the engine 17.

In step S14, the output module 34 sets the regulator 16a to the Hi state. This sets the output voltage of the alternator 16 to the Hi state, and the kinetic energy of the decelerating vehicle is used to (regeneratively) charge the hybrid battery 14. Once step S14 is complete, the process ends.

In step S15, the determination module 33 determines whether a flag int_flg that represents whether this is the first time that the process is executed after the engine 17 is started is equal to 0. If int_flg is equal to 0 (Yes in step S15), the flow proceeds to step S16. Otherwise (No in step S15), the flow proceeds to step S20. Here, int_flg is set to 0 when the engine 17 is stopped. Therefore, in the first time the process is executed after the engine 17 is started, the flow proceeds to step S16 since int_flg is equal to 0.

In step S16, the determination module 33 references the SOC calculated in step S11 and determines whether the SOC is greater than or equal to Th2. If the SOC is equal to or greater than Th2 (Yes in step S16), the flow proceeds to step S18. Otherwise (No in step S16), the flow proceeds to step S17. More specifically, in the first time this process is executed after the engine 17 is started, the flow proceeds to step S18 if the SOC is greater than or equal to Th2 (71%); otherwise, the flow proceeds to step S17.

In step S17, the output module 34 sets the regulator 16a to the Hi state. This sets the output voltage of the alternator 16 to the Hi state, and the power from the engine 17 is used to charge the hybrid battery 14. Once step S17 is complete, the flow proceeds to step S19.

In step S18, the output module 34 sets the regulator 16a to the Lo state. This sets the output voltage of the alternator 16 to the Lo state.

In step S19, the determination module 33 sets int_flg to 1. This ensures that, in the next time the process is executed, the result of the decision in step S15 is No and the flow proceeds to step S20.

In step S20, the determination module 33 references the SOC calculated in step S11 and determines whether the SOC is greater than or equal to Th2. If the SOC is greater than or equal to Th2 (Yes in step S20), the flow proceeds to step S21. Otherwise (No in step S20), the flow proceeds to step S22. More specifically, in the second and subsequent processes after the engine 17 is started, the flow proceeds to step S21 if the SOC is greater than or equal to Th2 (71%); otherwise, the flow proceeds to step S22.

In step S21, the output module 34 sets the regulator 16a to the Lo state. This sets the output voltage of the alternator 16 to the Lo state.

In step S22, the determination module 33 references the SOC calculated in step S11 and determines whether the SOC is less than or equal to Th1. If the SOC is less than or equal to Th1 (Yes in step S22), the flow proceeds to step S23. Otherwise (No in step S22), the flow proceeds to step S24. More specifically, in the second and subsequent times this process is executed after the engine 17 is started, the flow proceeds to step S23 if the SOC less than or equal to Th1 (70%); otherwise, the flow proceeds to step S24.

In step S23, the output module 34 sets the regulator 16a to the Hi state. This sets the output voltage of the alternator 16 to the Hi state.

In step S24, the output module 34 sets the voltage to be generated by the regulator 16a to the previous generated voltage. More specifically, if the previous generated voltage is set to Lo, the output module 34 sets the voltage to be generated to Hi, and if the previous generated voltage is set to Hi, the output module 34 sets the voltage to be generated to Lo. In this way, the previous value is used when the SOC satisfies Th1<SOC<Th2. Therefore, as illustrated in FIG. 8, the output voltage of the alternator 16 is maintained at the same value when the SOC is increasing or decreasing.

In step S25, the determination module 33 sets the current generated voltage as the previous generated voltage. More specifically, if the current generated voltage is set to Lo, the determination module 33 sets the previous generated voltage to Lo, and if the current generated voltage is set to Hi, the determination module 33 sets the previous generated voltage to Hi.

According to the process described above, in the first time the process is executed after the engine 17 is started, the SOC is referenced, and the voltage generated by the alternator 16 is set to the Hi state to charge the hybrid battery 14 to an SOC of greater than or equal to 71%. In the second and subsequent times the process is executed, the voltage to be generated is set to Lo if the SOC is greater than or equal to 71%, and the voltage to be generated is set to Hi if the SOC is less than or equal to 70%. When the SOC is greater than 70% and less than 71%, the previous generated voltage is maintained. This makes it possible to achieve the voltage setting illustrated in FIG. 8. Moreover, establishing two threshold values that exhibit hysteresis and controlling charging according thereto makes it possible to prevent chattering.

Moreover, the vehicle state is referenced, and when the vehicle is decelerating, the voltage to be generated is set to Hi and regenerative charging is enabled, thereby making it possible to improve fuel consumption.

Moreover, in the present embodiment, the charge control device 1 which includes the voltage sensor 11, the current sensor 12, and the temperature sensor 13 is configured to calculate the SOC in real time. In conventional technologies, the rechargeable battery had to be fully charged after the engine was started in order to be able to accurately calculate the SOC. In the present embodiment, however, the battery does not have to be fully charged after the engine is started, thereby making it possible to conserve the electric power that would be wasted when fully charging the battery.

(D) Description of Alternate Embodiments

It is needless to say that the embodiment described above is only an example and the present invention is not limited to the embodiment as described above. For example, in the embodiment above, the threshold values Th1 and Th2 are set to 70% and 71%, respectively, but other values may also be used. For example, the threshold values may be set to values less than or equal to 90% with a difference of greater than or equal to 1% between Th1 and Th2. Moreover, the actual measurement results make it clear that the smaller the difference between Th1 and Th2, the more fuel consumption improves. Therefore, when changing Th1 and Th2, it is preferable that Th1 and Th2 be set such that the difference therebetween is as small as possible. Th1 and Th2 may be set to the same value in cases where chattering is not a problem. Conversely, when the difference between these values is large, the hybrid battery 14 experiences larger changes in SOC during charging/discharging, which tends to exacerbate deterioration of the hybrid battery 14. Therefore, the difference between Th1 and Th2 should be less than 10%, and it is preferable that the difference between Th1 and Th2 be less than a few percent.

Moreover, in the above embodiment, the values of Th1 and Th2 are fixed, but these values may also be overwritten, for example. In this type of configuration, these values may be adjusted as appropriate according to the type of hybrid battery 14 as well as the intended use therefor, for example. Moreover, the hybrid battery 14 undergoes changes over time (deteriorates), which decreases the full chargeable capacity. Therefore, the values of Th1 and Th2 may be changed according to the changes over time (deterioration). More specifically, the OCV of the hybrid battery 14 (a value that correlates to the changes over time) may be measured, and the values of Th1 and Th2 may be decreased according to the measured OCV value. This configuration makes it possible to suitably control charging even as the hybrid battery 14 has undergone changes over time.

Furthermore, in the embodiment described above, the second threshold value for the normal process is used as the threshold value for the initial process. However, the threshold value for the initial process may be different from the second threshold value. For example, a value larger than the second threshold value allows for a rapid charging to a prescribed SOC during the initial process. Note that the use of the second threshold value for the threshold value for the initial process, as in the present embodiment, allows for a smooth transition from the initial process to the normal process.

Figure 14:
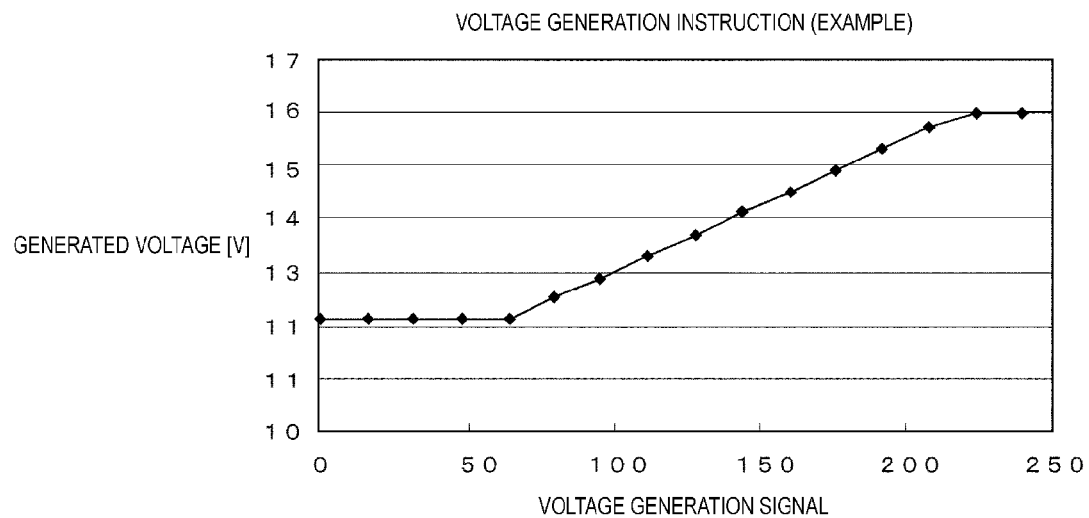
FIG. 14 shows the relationship between an alternator voltage generation signal and the voltage generated by the alternator in an alternate embodiment of the present invention.

In addition, in the embodiment described above, the alternator 16 can be set to two types of voltages, that is Hi and Lo. However, an alternator that can output a desired voltage according to a voltage generation signal, as shown in FIG. 14, may also be used. In the example shown in FIG. 14, when the voltage generation signal is in the range of 0 to approximately 60, the generated voltage is fixed at just over 11V. When the signal is in the range of 60 to 220, the voltage increases according to the signal, and the signal more than 220 causes the voltage to be fixed. When this type of alternator is used, the voltage can be set to 12.0±0.5V when the vehicle is accelerating or traveling at a constant speed, and the voltage can be set to 15.0V or greater when the vehicle is decelerating, for example. Similarly, when the SOC is greater than or equal to the second threshold value Th2, the voltage to be generated can be set to 12.0±0.5V, and when the SOC is less than or equal to the first threshold value Th1, the voltage to be generated can be set to 14.5V, for example. Needless to say, these values are only examples, and the present invention is not limited to such cases.

Figure 15:
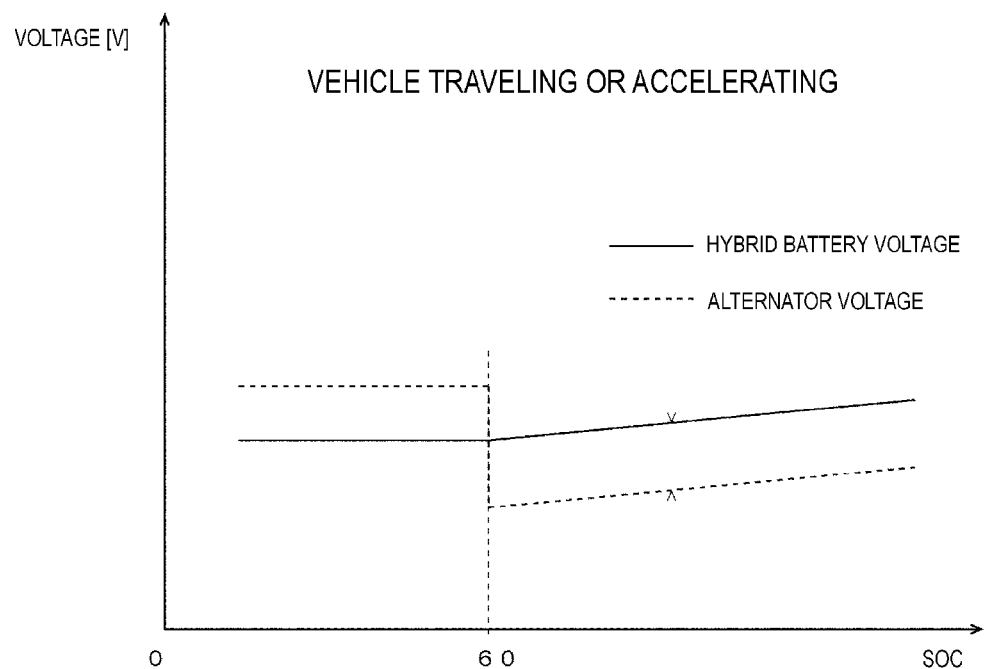
FIG. 15 shows the relationship between the voltages and the SOC when the vehicle is traveling and accelerating in the alternate embodiment of the present invention.
Figure 16:
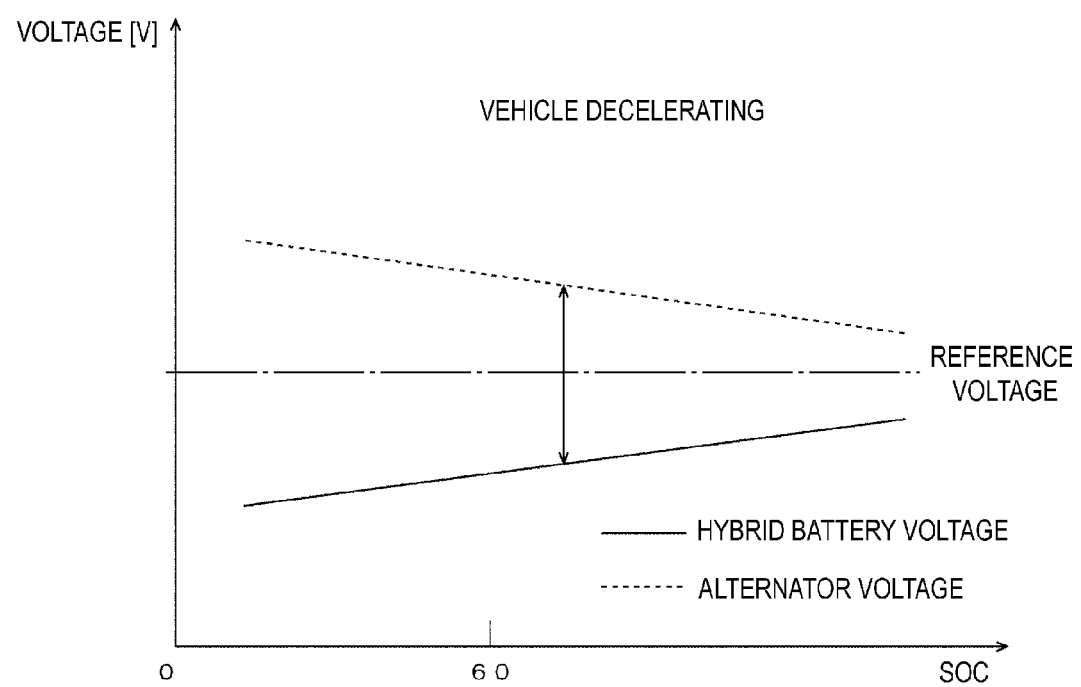
FIG. 16 shows the relationship between the voltages and the SOC when the vehicle is decelerating in the alternate embodiment of the present invention.

Moreover, rather than setting the voltage to a Hi or Lo state, the voltage may be changed according to the SOC, as shown in FIGS. 14 and 15. FIG. 15 shows the relationship between SOC and voltage when the vehicle is traveling at a constant speed or accelerating. In the example in FIG. 15, when the SOC is less than or equal to 60%, the voltage to be generated by the alternator (indicated by the dashed line) is set higher than the voltage of the hybrid battery. When the SOC is greater than 60%, the voltage to be generated by the alternator is set lower than the voltage of the hybrid battery. In this case, the difference between the voltages of the alternator and the hybrid battery is set constant. FIG. 16 shows the relationship between SOC and voltage when the vehicle is decelerating. In the example in FIG. 16, when the vehicle is decelerating, the difference between the voltages of the hybrid battery and the alternator becomes smaller as the SOC increases. More specifically, the voltage generated by the alternator may be controlled such that the difference between the reference voltage indicated by the long dashed short dashed line and the voltage of the alternator is equal to the difference between the reference voltage and the voltage of the hybrid battery. As an example, the difference between the terminal voltage of the hybrid battery 14 and the reference voltage is determined, and the output voltage of the alternator 16 may be set equal to a voltage obtained by adding the voltage difference to the reference voltage.

Moreover, when supplying electric power to the load 19 from the hybrid battery 14, the voltage of the alternator 16 may be set lower than the terminal voltage of the hybrid battery 14 to ensure that electric power is reliably supplied from the hybrid battery 14 to the load 19. This kind of control is particularly effective because the voltage of the hybrid battery 14 is lower than that of a typical lead-acid battery.

Furthermore, in the embodiment described above, the value measured by the temperature sensor 13 has not been explained in detail. However, because the characteristics of the hybrid battery 14 change according to the ambient temperature, the SOC calculated on the basis of the output from the temperature sensor 13 may be corrected.

In addition, in the embodiment described above, the SOC range and the reference value are fixed. However, these values may be changed according to the state of the hybrid battery 14 (such as the state of deterioration), for example. More specifically, the capacity of the hybrid battery 14 decreases as the hybrid battery 14 deteriorates. Therefore, to achieve the same capacity as before, the SOC range must be set wider.

Figure 13:
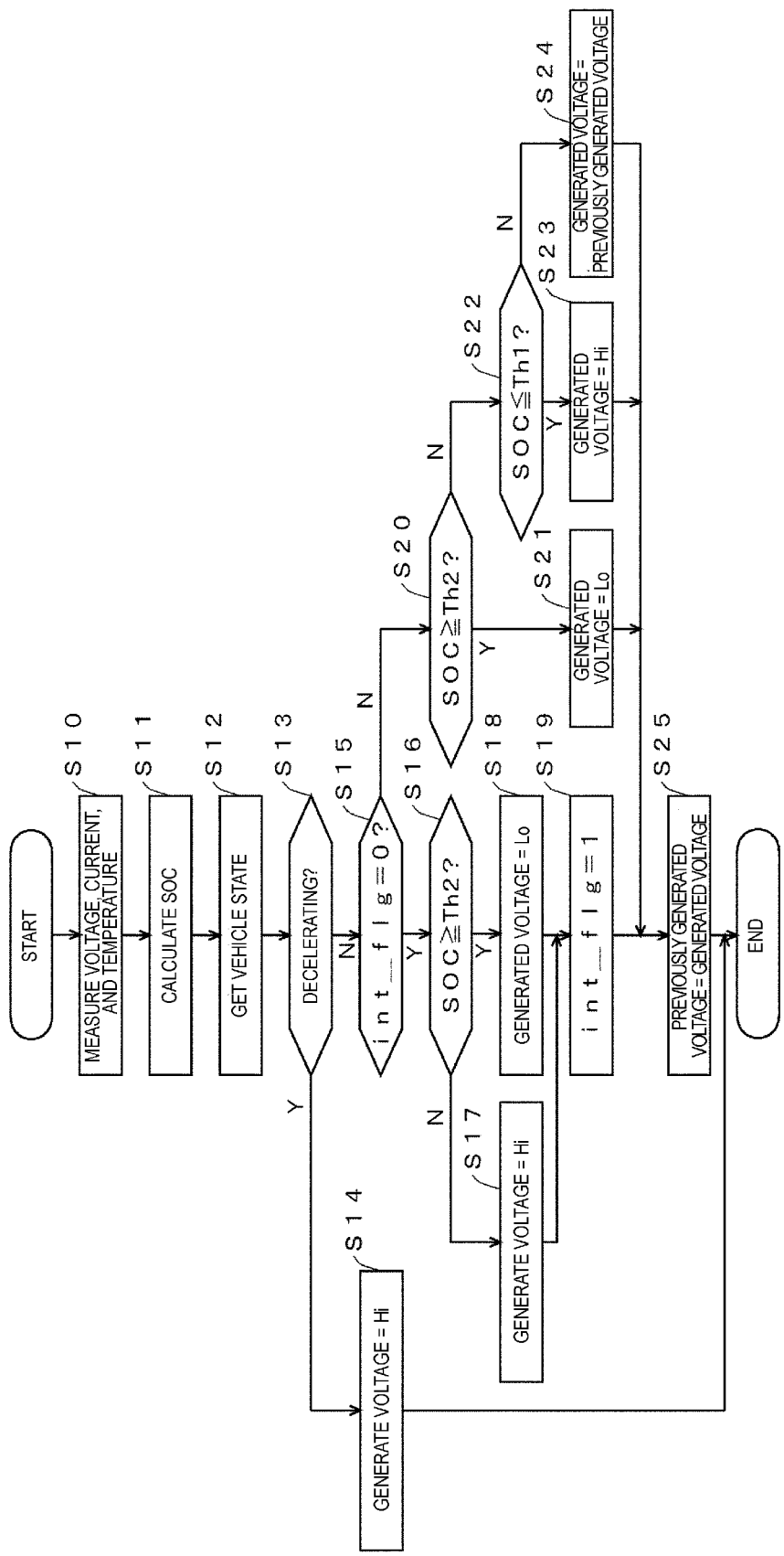
FIG. 13 is a flowchart of an example of processing that is executed in the embodiment illustrated in FIG. 1.

Moreover, the flowchart illustrated in FIG. 13 is only an example, and the present invention is not limited to such processing.

Figure 17:
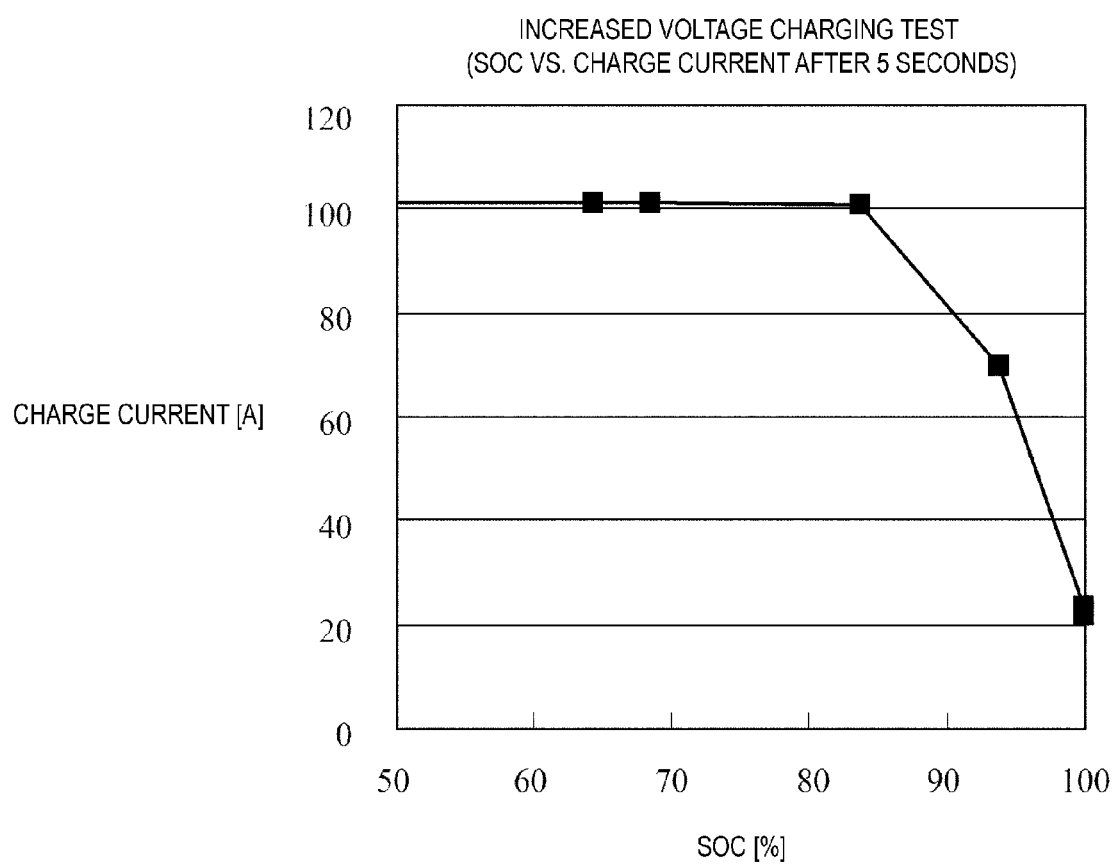
FIG. 17 shows the relationship between the SOC and the charge current of another hybrid battery.
Figure 18:
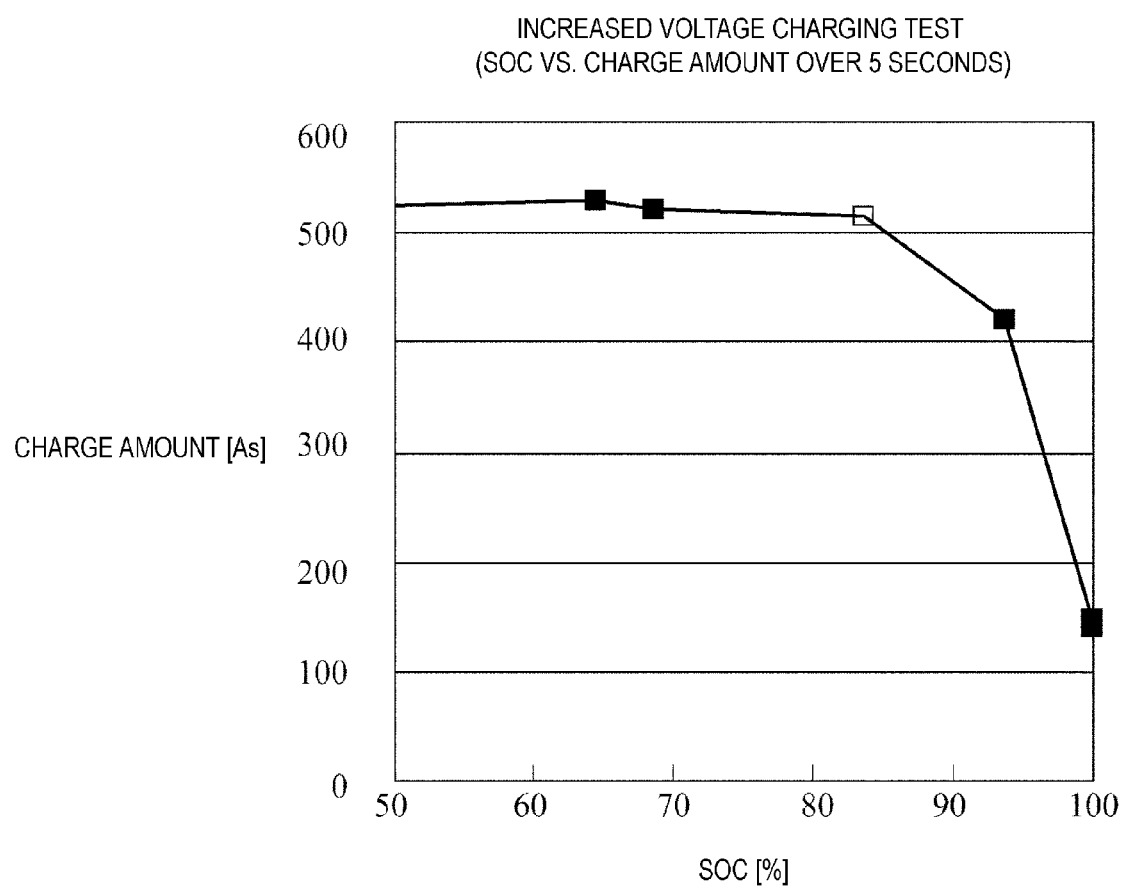
FIG. 18 shows the relationship between the SOC and the amount of charge of another hybrid battery.

Furthermore, in the embodiment described above, Th1, Th2, and Thu are set to 70%, 71%, and 75%, respectively, as an example. However, the present invention is not limited to such cases. FIG. 17 shows the relationship between charge current and SOC at 5 seconds after charging begins when charging a lead-acid battery different than that for FIG. 6 at a charge current of 100 A. Moreover, FIG. 18 shows the relationship between the amount of charge (As) and SOC at 5 seconds after charging begins when charging the same lead-acid battery as for FIG. 17 at a charge current of 100 A. In the example shown in FIGS. 17 and 18, the charge current and the amount of charge begin to decrease upon the SOC exceeding 80%. Therefore, for the lead-acid battery used for FIGS. 17 and 18, an SOC value of 80 to 85% may be selected as the low SOC region upper limit threshold value Thu. In addition, according to the result of testing, made by the inventor, of a variety of lead-acid batteries, it has been found that setting the low SOC region upper limit threshold value Thu to 80 to 85% makes it possible to achieve the desired result for most types of lead-acid batteries. Therefore, it is preferable that the low SOC region upper limit threshold value Thu be set to or lower than about 80 to 85%. Moreover, the margin m illustrated in FIG. 9 may be set to a value of a few percent, for example. The margin m may also be set to a larger value or to a smaller value (including zero).

Furthermore, while it is possible for the vehicle to include several electric power storage devices for starting the engine 17, such as a lithium battery, a nickel battery, a nickel-hydrogen battery, and a capacitor), it is preferable that a hybrid battery be used as a single electric power storage device in consideration of the additional weight, maintenance, and the like of a secondary battery.

REFERENCE NUMBER

1 Charge control device
10 Control unit (calculation means, control means)
10a CPU
10b ROM
10c RAM
10d Communication unit
10e Bus
10f Interface (I/F)
11 Voltage sensor (Calculation means)
12 Current sensor (Calculation means)
13 Temperature sensor (Calculation means)
14 Hybrid battery (Secondary battery)
15 Discharge circuit
16 Alternator
16a Regulator
17 Engine
18 Starter motor
19 Load
20 Vehicle state detection unit (Detection means)

What is claimed is:

1. A charge control device for controlling a charge state of a secondary battery equipped in a vehicle, the device comprising:
calculation means for calculating a current charge state of the secondary battery based on charge and discharge currents and a terminal voltage of the secondary battery;
detection means for detecting a traveling state of the vehicle; and
control means for, when the detection means detects that the vehicle is decelerating, setting a voltage generated by an alternator higher than the terminal voltage of the secondary battery in order to charge the secondary battery with regeneratively generated electric power, and when the detection means detects that the vehicle is not decelerating, setting the voltage generated by the alternator lower than the terminal voltage of the secondary battery when a state of charge of the secondary battery calculated by the calculation means is greater than a prescribed second threshold value, and setting the voltage generated by the alternator higher than the terminal voltage of the secondary battery when the state of charge of the secondary battery calculated by the calculation means is less than a prescribed first threshold value;
the second threshold value being greater than the first threshold value, and the first threshold value and the second threshold value being set within a low SOC region.

2. The charge control device according to claim 1, wherein
when the secondary battery is charged with a maximum charge current of the alternator within an output voltage range of the alternator,
the low SOC region is set such that a time from when charging begins until a charge current that flows to the secondary battery begins to decrease from the maximum charge current is greater than or equal to a prescribed value.

3. The charge control device according to claim 1, wherein
the low SOC region is set according to a relationship between an internal resistance of the secondary battery and the state of charge of the secondary battery such that the internal resistance is less than or equal to a prescribed value.

4. The charge control device according to claim 1, wherein
the low SOC region is a region in which a charge current that flows to the secondary battery is greater than or equal to a prescribed value when a prescribed time elapses after charging begins.

5. The charge control device according to claim 1, wherein
the low SOC region is a region in which an amount of charge stored in the secondary battery from when charging begins until a prescribed time elapses is greater than or equal to a prescribed value.

6. The charge control device according to claim 1, wherein
the secondary battery is a hybrid secondary battery in which a secondary battery that stores electric power using an electrochemical reaction is combined with a capacitor that takes advantage of an electric charge absorption phenomenon.

7. The charge control device according to claim 1, wherein
the calculation means measure internal impedance using pulse discharge from a discharge circuit and calculates the state of charge based on a parameter of an equivalent circuit model of the secondary battery.

8. The charge control device according to claim 1, wherein
the electric power storage device equipped in the vehicle for storing the regeneratively generated electric power only includes the secondary battery.

9. The charge control device according to claim 1, wherein
the control means change the first threshold value and the second threshold value according to a state of the secondary battery.

10. The charge control device according to claim 1, wherein
when the vehicle is not decelerating, the voltage generated by the alternator is set lower than the terminal voltage of the secondary battery in order to supply power from the secondary battery to a load.

11. The charge control device according to claim 1, wherein the alternator has a range of voltage to generate that is selected from a first voltage range and a second voltage range that is lower than the first voltage range; and wherein the control means select one of the first voltage range and the second voltage range according to the state of the secondary battery and the state of the vehicle.

12. The charge control device according to claim 1, wherein the alternator is capable of outputting a specified voltage; and wherein the control means cause the alternator to output a voltage according to the state of the secondary battery and the state of the vehicle.

13. The charge control device according to claim 12, wherein the control means control the alternator according to the traveling state of the vehicle and the state of charge of the secondary battery such that a difference between the terminal voltage of the secondary battery and the voltage generated by the alternator is equal to a prescribed desired value.

14. The charge control device according to claim 13, wherein when the vehicle is decelerating, the control means determine a difference voltage between the terminal voltage of the secondary battery and a reference voltage and control the alternator such that the alternator generates a voltage that is equal to a voltage obtained by adding the difference voltage to the reference voltage.

15. The charge control device according to claim 1, wherein the control means determine that the vehicle is decelerating when a vehicle speed is greater than or equal to a prescribed speed and an instruction to cut supply of fuel has been issued in the form of a fuel cut instruction signal.

16. The charge control device according to claim 15, wherein it is determined that the vehicle is decelerating when, in addition to the vehicle speed and fuel cut instruction signal, a degree of opening of an accelerator of the vehicle is less than or equal to a prescribed degree of opening.

17. The charge control device according to claim 16, wherein regenerative charging is stopped when any one of the vehicle speed, the fuel cut instruction signal, and the degree of opening of the accelerator no longer fulfills conditions.

18. A charge control method for controlling a state of charge of a secondary battery equipped in a vehicle, the method comprising the step of:

calculating a current state of charge of the secondary battery based on charge and discharge currents and a terminal voltage of the secondary battery;

detecting a traveling state of the vehicle; and controlling to, when the step of detecting detects that the vehicle is decelerating, set a voltage generated by an alternator higher than the terminal voltage of the secondary battery in order to charge the secondary battery with regeneratively generated power, and when the step of detecting detects that the vehicle is not decelerating, set the voltage generated by the alternator lower than the terminal voltage of the secondary battery when a state of charge of the secondary battery calculated by the step of calculating is greater than a prescribed second threshold value, and set the voltage generated by the alternator higher than the terminal voltage of the secondary battery when the state of charge of the secondary battery calculated by the step of calculating is less than a prescribed first threshold value;

the second threshold value being greater than the first threshold value, and the first threshold value and the second threshold value being set within a low SOC region.

* * * * *